United States Patent
Kuo et al.

(10) Patent No.: US 9,771,125 B1
(45) Date of Patent: Sep. 26, 2017

(54) DUAL ACTUATED MECHANICAL DISK BRAKE DEVICE

(71) Applicant: Jui-Pin Chen, Changhua, Changhua Hsien (TW)

(72) Inventors: Po-Wen Kuo, Changhua (TW); Sheng-Chang Chen, Changhua (TW)

(73) Assignee: Jui-Pin Chin (TW)

( * ) Notice: Subject to any disclaimer, the term of this patent is extended or adjusted under 35 U.S.C. 154(b) by 0 days.

(21) Appl. No.: 15/201,543

(22) Filed: Jul. 4, 2016

(51) Int. Cl.
| | | |
|---|---|---|
| *B62L 5/00* | (2006.01) | |
| *B62L 3/02* | (2006.01) | |
| *F16D 55/225* | (2006.01) | |
| *F16D 65/00* | (2006.01) | |
| *F16D 55/00* | (2006.01) | |

(52) U.S. Cl.
CPC .............. *B62L 3/02* (2013.01); *F16D 55/225* (2013.01); *F16D 65/0068* (2013.01); *F16D 2055/0016* (2013.01)

(58) Field of Classification Search
CPC .... B62L 3/02; F16D 2125/36; F16D 2125/60; F16D 2055/0016; F16D 2055/002
USPC .......................................................... 188/26
See application file for complete search history.

(56) References Cited

U.S. PATENT DOCUMENTS

| | | | | |
|---|---|---|---|---|
| 2,612,968 A | * | 10/1952 | Elliott ...................... B62L 3/00 188/26 |
| 3,878,921 A | * | 4/1975 | Kibler ...................... B62L 1/00 188/26 |
| 3,920,102 A | * | 11/1975 | Ito ......................... F16D 65/567 188/196 BA |
| 4,029,179 A | * | 6/1977 | Butz ......................... B62L 1/02 188/196 B |
| 4,454,933 A | * | 6/1984 | Hunnicutt ............. F16D 55/224 188/196 D |
| 4,633,978 A | * | 1/1987 | Hoff ...................... F16D 55/224 188/196 M |
| 5,060,765 A | * | 10/1991 | Meyer ..................... F16D 65/18 188/106 F |
| 5,529,150 A | * | 6/1996 | Buckley ............ F16D 55/22655 188/196 D |
| 5,979,609 A | * | 11/1999 | Tsai ......................... B62L 1/00 188/26 |
| 6,250,438 B1 | * | 6/2001 | Chern ...................... B62L 1/00 188/72.3 |
| 6,382,365 B1 | * | 5/2002 | Chen ................... F16D 55/2265 188/26 |

(Continued)

*Primary Examiner* — Anna Momper
*Assistant Examiner* — Mahbubur Rashid
(74) *Attorney, Agent, or Firm* — Hershkovitz & Associates, PLLC; Abe Hershkovitz

(57) ABSTRACT

A disk brake device has a fixing member, a housing, two brake pads, a driving assembly, and a pushing element. The driving assembly is mounted on the housing and has an axle, a driving arm, a driving disk, a pushing disk, multiple driving elements, and a spring. The driving disk is mounted securely on and around the axle. The pushing disk is mounted rotatably on and around the axle. Each of the driving disk and the pushing disk has a side facing each other and multiple guiding recesses defined in the side. Each guiding recess has a deep end and a shallow end. The driving elements are held respectively in corresponding guiding recesses. The pushing element is mounted between the driving assembly and the fixing member and abutting against one of the driving assembly and the fixing member.

8 Claims, 10 Drawing Sheets

(56) References Cited

U.S. PATENT DOCUMENTS

| | | | | |
|---|---|---|---|---|
| 6,394,236 | B1* | 5/2002 | Matsuishita | B62L 1/00 188/24.22 |
| 6,520,297 | B1* | 2/2003 | Lumpkin | B60T 11/046 188/24.15 |
| 6,557,671 | B1* | 5/2003 | Kirimoto | B60T 11/046 188/26 |
| 6,684,982 | B2* | 2/2004 | Kariyama | B62L 1/005 188/196 M |
| 8,662,260 | B2* | 3/2014 | Baldeosingh | F16D 65/12 188/72.7 |
| 2005/0039989 | A1* | 2/2005 | Huang | B60T 8/3225 188/26 |
| 2012/0261219 | A1* | 10/2012 | Nakakura | B62L 1/00 188/72.1 |
| 2014/0131149 | A1* | 5/2014 | Chang | F16D 65/18 188/73.44 |

* cited by examiner

DUAL ACTUATED MECHANICAL DISK BRAKE DEVICE

BACKGROUND OF THE INVENTION

1. Field of the Invention

The present invention relates to a disk brake device, and more particularly to a dual actuated mechanical disk brake device for a bicycle.

2. Description of Related Art

A conventional bicycle disk brake device includes different types such as single-sided, dual actuated and single-sided-actuated types. The conventional single-sided disk brake device will cause deformation of a brake disk and cannot provide sufficient braking effect to the bicycle. The conventional dual actuated disk brake device is driven by hydraulic power and has a complicated structure at a high cost. The conventional single-sided-actuated disk brake device substantially comprises a housing and two brake pads. When the disk brake device is actuated, one of the brake pads abuts against a side of a brake disk and the housing is moved toward the other side of the brake disk by the counterforce provided by the brake disk to enable the brake pads to abut against two sides of the brake disk. However, the brake disk is deformed during the operation of the conventional disk brake device and is easily damaged. In addition, the counterforce provided by the brake disk is insufficient due to the low rigidity of the bicycle brake disk. Therefore, the braking effect provided by the conventional disk brake device is insufficient.

To overcome the shortcomings, the present invention tends to provide a disk brake device to mitigate or obviate the aforementioned problems.

SUMMARY OF THE INVENTION

The main objective of the invention is to provide a disk brake device that can provide a sufficient braking effect.

The disk brake device has a fixing member, a housing, two brake pads, a driving assembly, and a pushing element. The fixing member is adapted to be securely mounted on a bicycle frame. The housing is moveably connected with the fixing member and has an outer surface and a clamping slit defined in the outer surface of the housing. The brake pads are mounted in the housing and are respectively located at two sides of the clamping slit. The driving assembly is mounted on the housing and has an axle, a driving arm, a driving disk, a pushing disk, multiple driving elements, and a spring. The axle is mounted rotatably in the housing and has a first end extending out of the housing. The driving arm is mounted securely on the first end of the axle. The driving disk is held in the housing and is mounted securely on and around the axle. The pushing disk is held in the housing at a position between the driving disk and an inner surface of the housing and is mounted rotatably on and around the axle. Each of the driving disk and the pushing disk has a side facing each other and multiple guiding recesses defined in the side. The guiding recesses in the driving disk correspond in position respectively to the guiding recesses in the pushing disk. Each guiding recess in one of the driving disk and the pushing disk has two ends. One of the ends has a depth deeper than a depth of the other end to define a deep end and a shallow end in the guiding recess. The driving elements are mounted between the driving disk and the pushing disk and are held respectively in corresponding guiding recesses in the driving disk and the pushing disk. The spring is mounted around the axle at a position between the housing and the driving arm and has two ends respectively abutting the housing and the driving arm. The pushing element is mounted between the driving assembly and the fixing member and abutting against one of the driving assembly and the fixing member.

Other objects, advantages and novel features of the invention will become more apparent from the following detailed description when taken in conjunction with the accompanying drawings.

DETAILED DESCRIPTION OF PREFERRED EMBODIMENT

Figure 1:
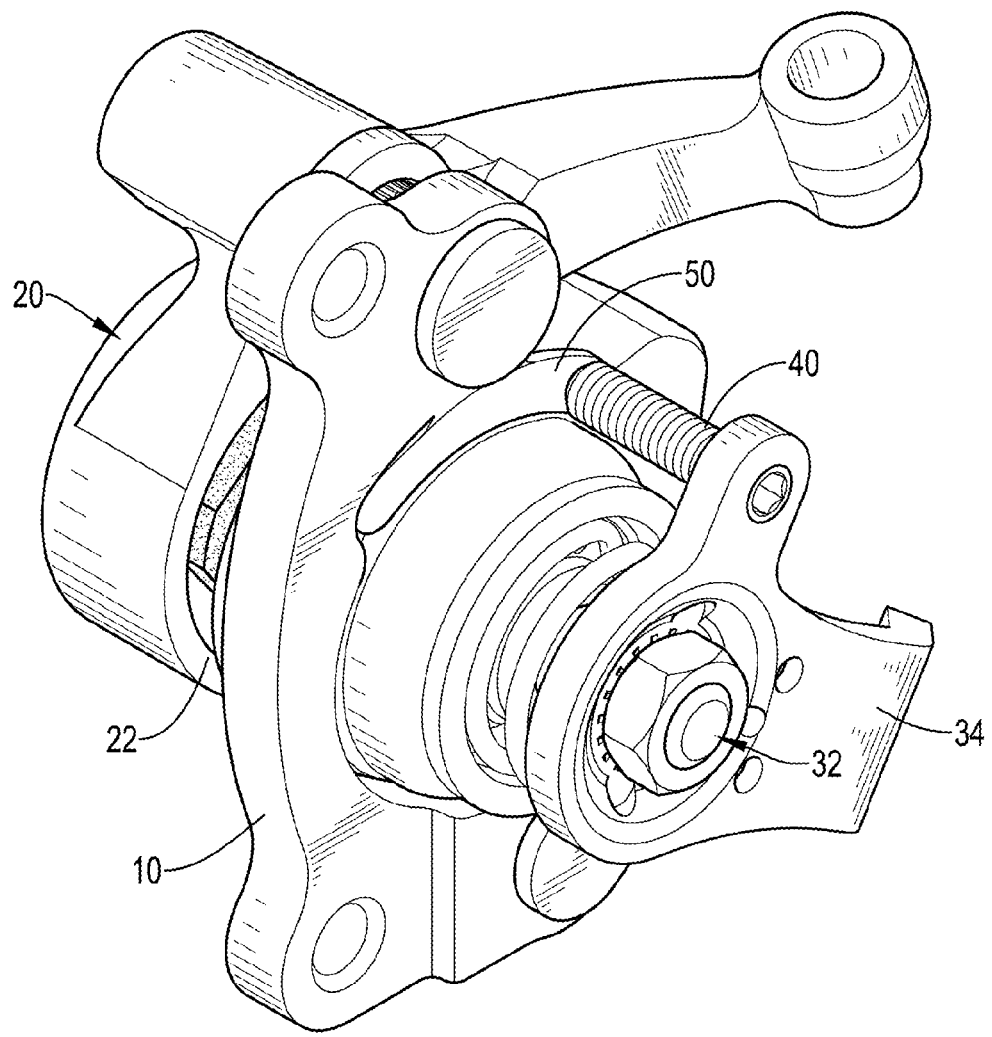
FIG. 1 is a perspective view of a disk brake device in accordance with the present invention.
Figure 2:
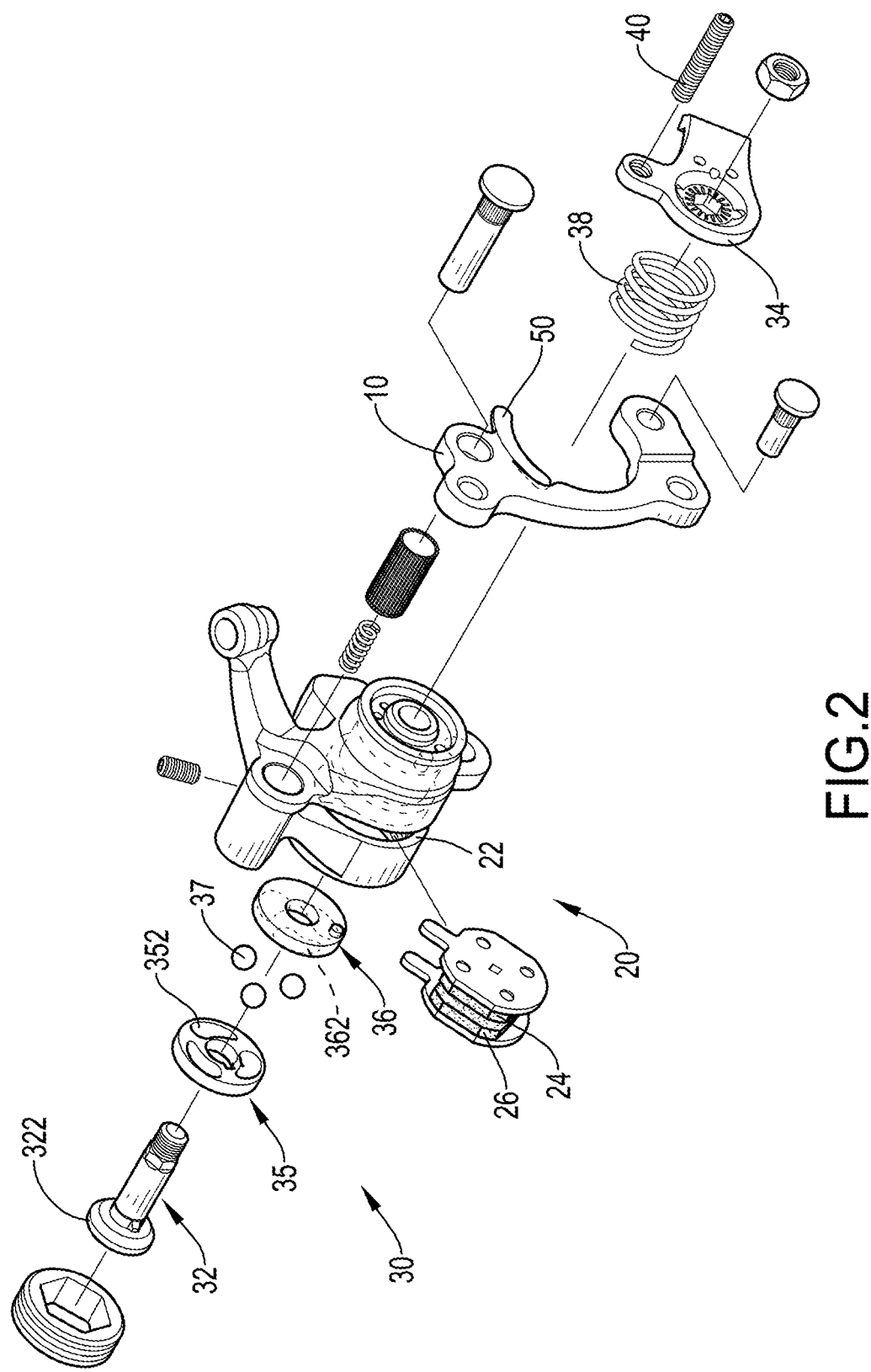
FIG. 2 is an exploded view of a first embodiment a disk brake device in accordance with the present invention.
Figure 3:
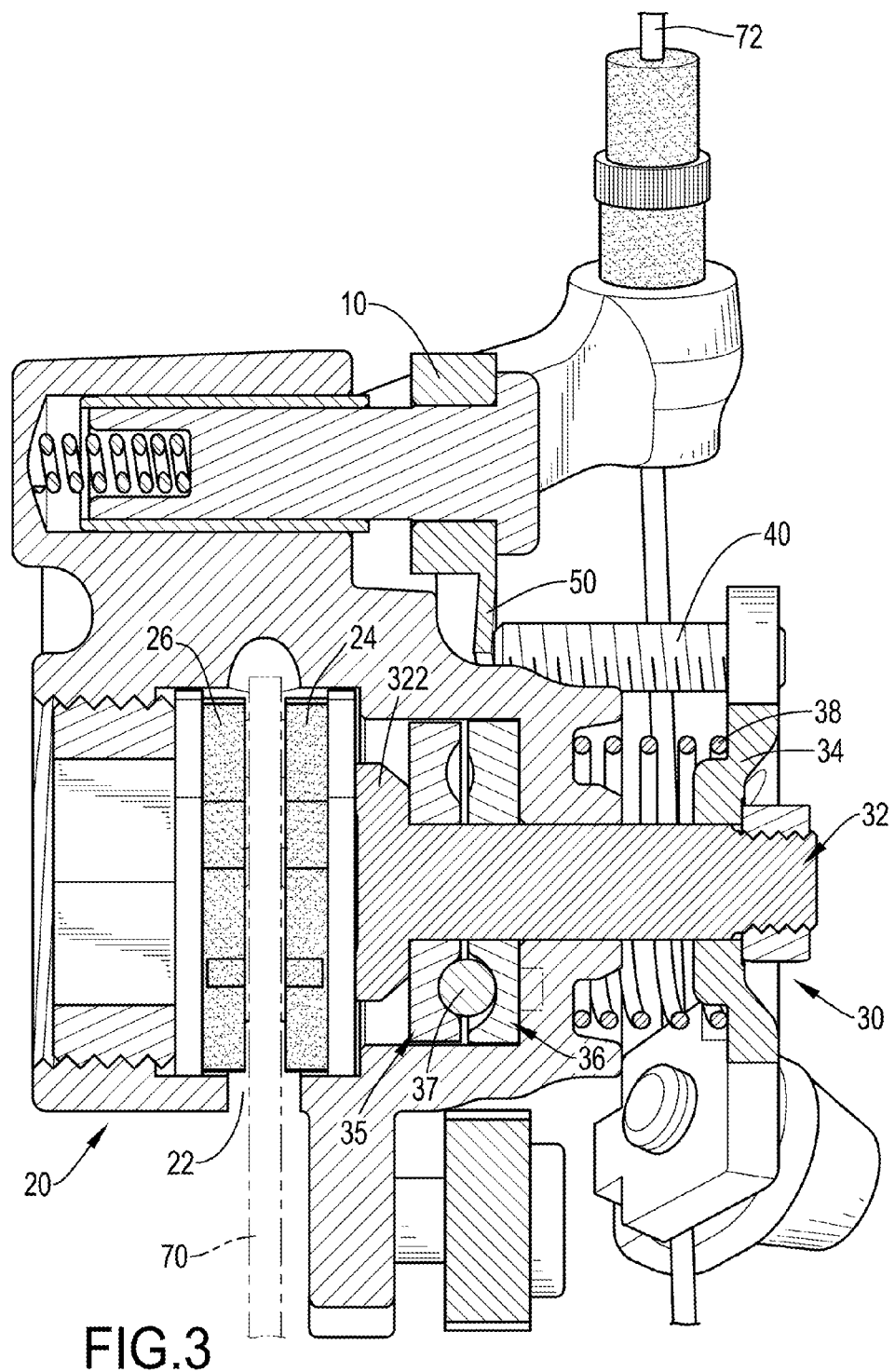
FIG. 3 is an enlarged side view in partial section of the disk brake device in FIG. 2.
Figure 4:
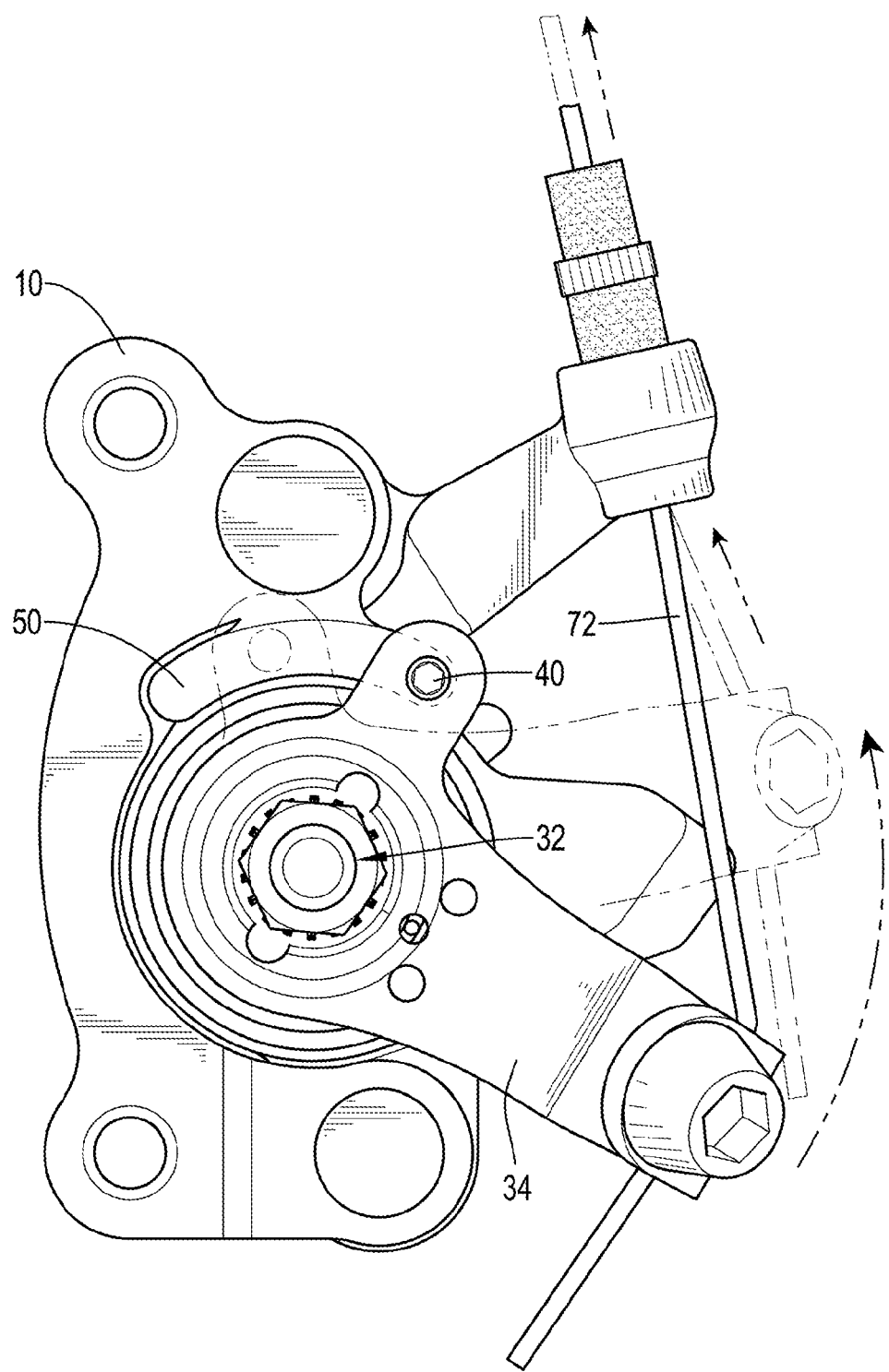
FIG. 4 is an enlarged operational side view of the disk brake device in FIG. 2.
Figure 5:
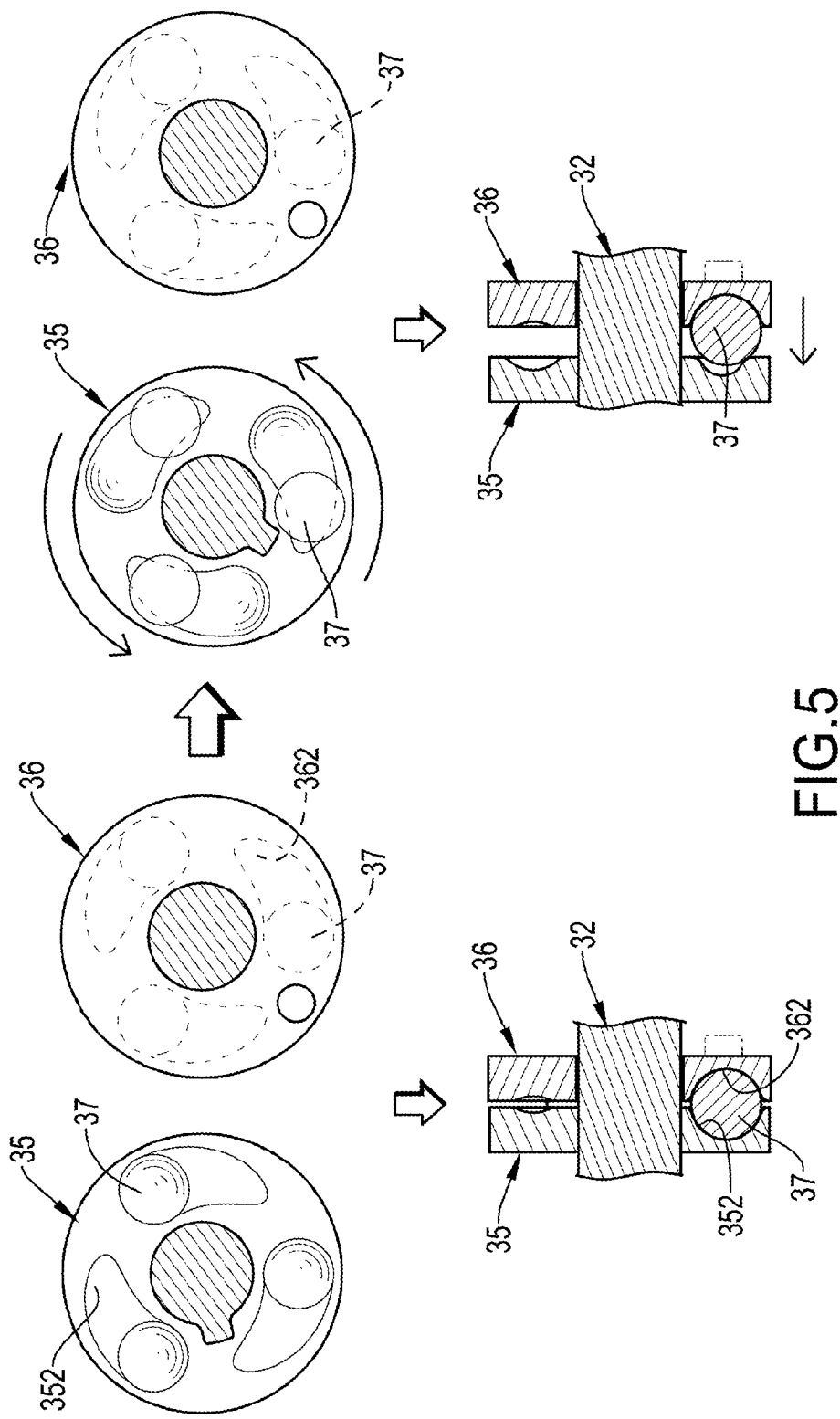
FIG. 5 shows operational cross-sectional side views of the disk brake device in FIG. 2.
Figure 6:
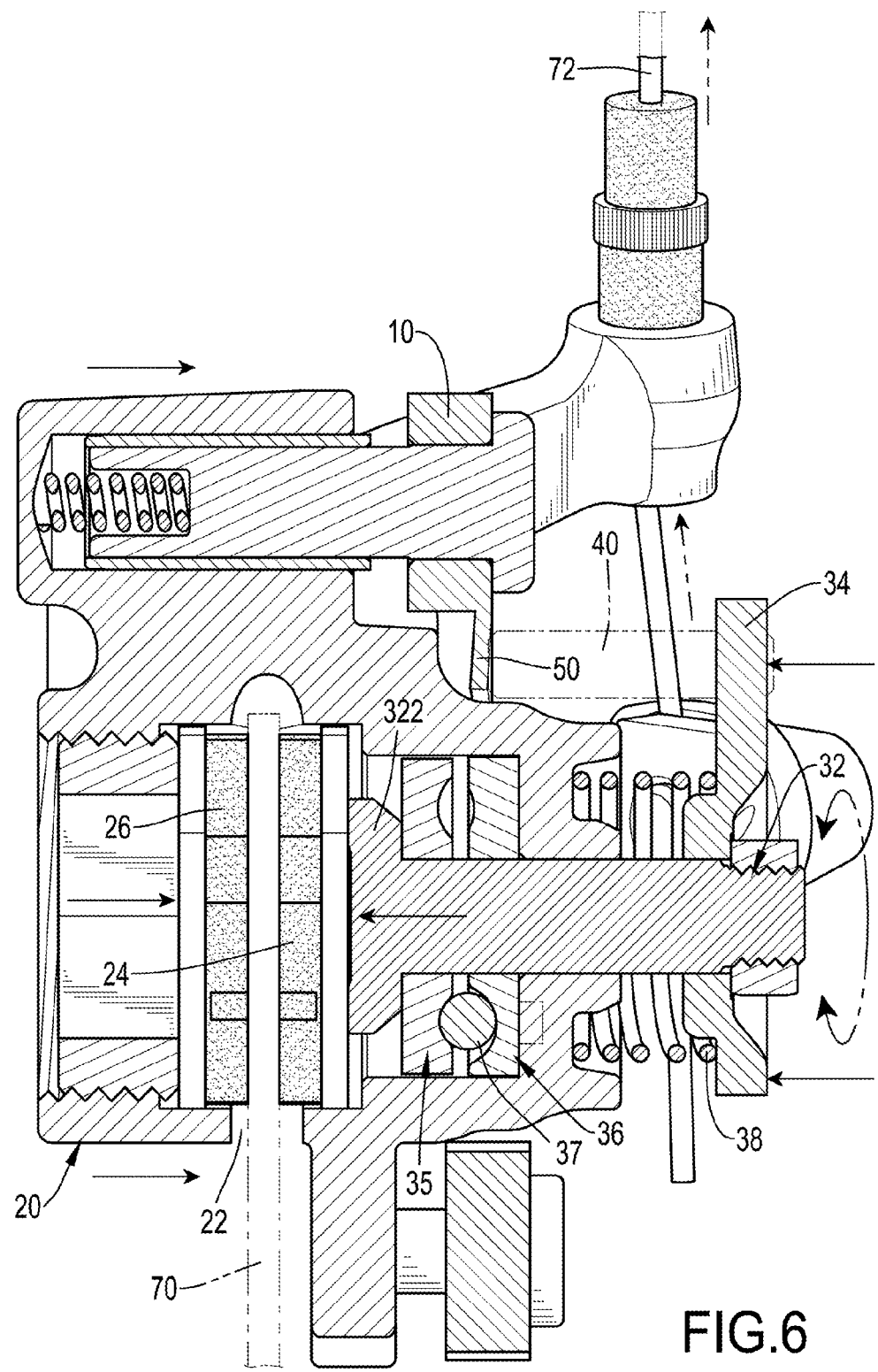
FIG. 6 is an enlarged operational side view in partial section of the disk brake device in FIG. 2.

With reference to FIG. 1, a disk brake device in accordance with the present invention comprises a fixing member 10, a housing 20, two brake pads 24,26, a driving assembly 30, and a pushing element 40.

The fixing member 10 is adapted to be securely mounted on a bicycle frame. The housing 20 is moveably connected with the fixing member 10 and has an outer surface and a clamping slit 22 defined in the outer surface of the housing 20 to hold a part of a brake disk 70 inside the clamping slit 22. The brake pads 24,26 are mounted in the housing 20 and are respectively located at two sides of the clamping slit 22.

The driving assembly 30 is mounted on the housing 20 and comprises an axle 32, a driving arm 34, a driving disk 35, a pushing disk 36, multiple driving elements 37, and a spring 38. The axle 32 is mounted rotatably in the housing 20 and has a first end and a second end, and the first end extends out of the housing 20. The second end is opposite the first end, and a pressing segment 322 is formed on the second end and selectively abuts one of the brake pads 24. The driving arm 34 is mounted securely on the first end of the axle 32 and is connected with a brake lever by a brake cable 72. The driving disk 35 is held in the housing 20, is mounted securely on and around the axle 32, and abuts the pressing segment 322 on the axle 32. The pushing disk 36 is held in the housing 20 at a position between the driving disk 35 and an inner surface of the housing 20 and is mounted rotatably on and around the axle 32. Each of the driving disk 35 and the pushing disk 36 has a side facing each other and multiple guiding recesses 352,362 defined in the side. The guiding recesses 352 in the driving disk 35 correspond in position respectively to the guiding recesses 362 in the pushing disk 36. Each guiding recess 352,362 in each of the driving disk 35 and the pushing disk 36 has two ends. One of the two ends has a depth deeper than a depth of the other end to define a deep end and a shallow end in the guiding recess 352,362. The driving elements 37 may be balls, are mounted between the driving disk 35 and the pushing disk 36, and are held respectively in corresponding guiding recesses 352,362 in the driving disk 35 and the pushing disk 36. Each driving element 37 is held in the deep ends of the corresponding guiding recesses 352,362 in the driving disk 35 and the pushing disk 36. The spring 38 is mounted around the axle 32 at a position between the housing 20 and the driving arm 34 and has two ends respectively abutting the housing 20 and the driving arm 34.

The pushing element 40 is mounted between the driving assembly 30 and the fixing member 10 and abuts against one of the driving assembly 30 and the fixing member 10. In the first embodiment, the pushing element 40 is a rigid rod, such as a threaded rod, and has a first end and a second end. The first end of the pushing element 40 is securely connected with the driving arm 34. The second end of the pushing element 40 abuts against the fixing member 10. Preferably, the fixing member 10 has a curved pressed member 50 abutted against by the second end of the pushing element 40 and being inclined relative to the fixing member 10.

With reference to FIGS. 3 to 6, when the brake lever is pressed, the driving arm 34 is driven to pivotally rotate relative to the housing 20 via the transmission of the brake cable 72. With the pivotal rotation of the driving arm 34, the axle 32 is rotated and the driving disk 35 is rotated with the axle 32. With the rotation of the driving disk 35, the driving elements 37 are moved from the deep ends of the guiding recesses 352,362 to the shallow ends of the guiding recesses 352,362. Accordingly, the driving disk 35 and the pushing disk 36 are pushed to move away from each other by the driving elements 37. Consequently, the driving disk 35 will push a corresponding brake pad 24 to abut against one side of the brake disk 70 by the pressing segment 322 on the second end of the axle 32. At the same time, the pushing disk 36 will push the housing 20 to move toward the fixing member 10 to enable the other brake pad 26 to abut against the other side of the brake disk 70. Thus, a braking effect is provided to the bicycle.

In addition, while the driving arm 34 is pivoting relative to the housing 20, the pushing element 40 is moved with the driving arm 34 along the curved pressed member 50 on the fixing member 10. Because the pressed member 50 is securely mounted on the fixing member 10 and is kept stationary, the pressed member 50 will apply a counterforce to the pushing element 40. With the counterforce applied to the pushing element 40, the housing 20 is actuated to move toward the fixing member 10. Accordingly, the two brake pads 24,26 can simultaneously abut against two sides of the brake disk 70 to provide an even braking force to the brake disk 70 and to prevent the brake disk 70 from being deformed during the braking operation.

Figure 7:
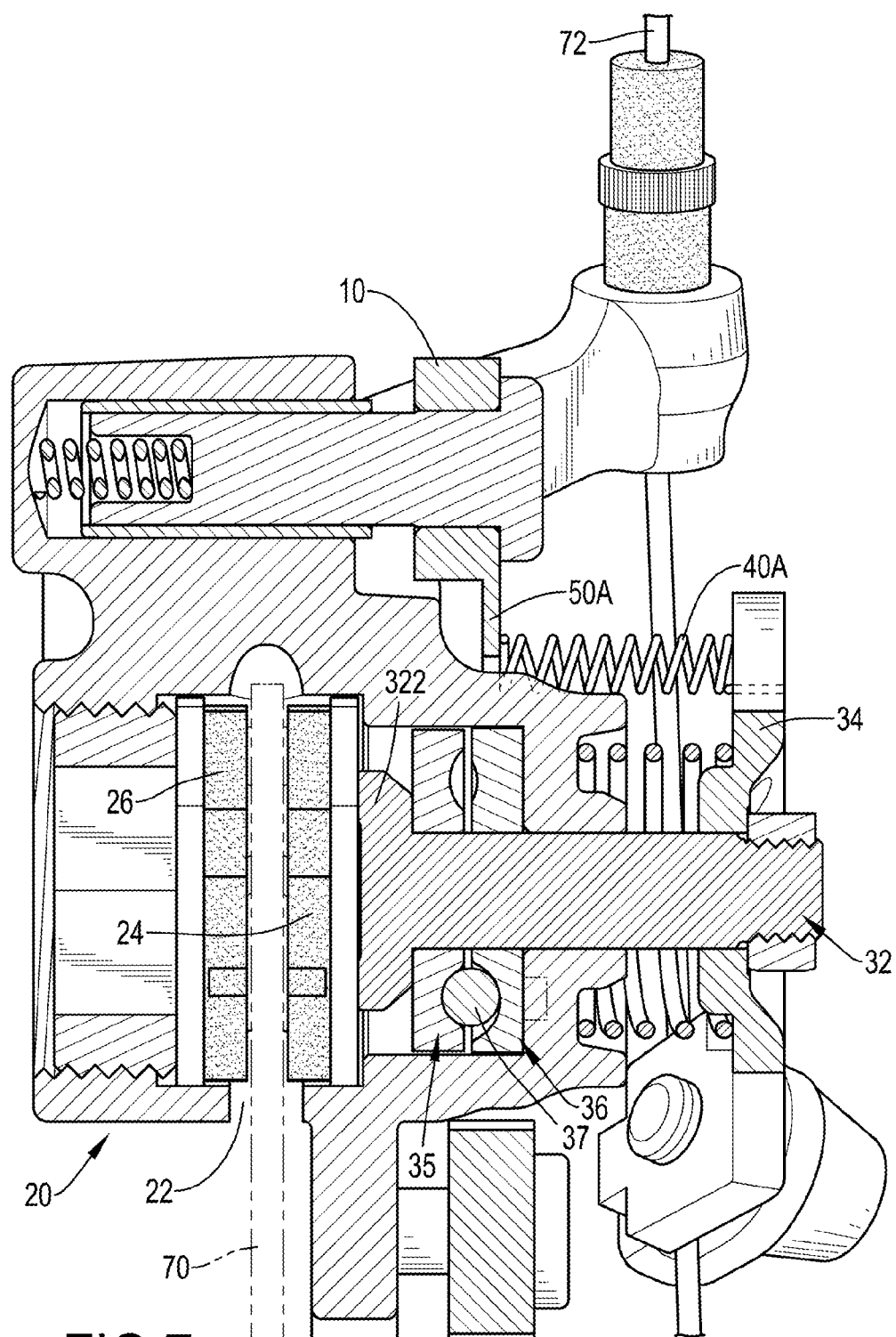
FIG. 7 is a side view in partial section of a second embodiment of a disk brake device in accordance with the present invention.
Figure 8:
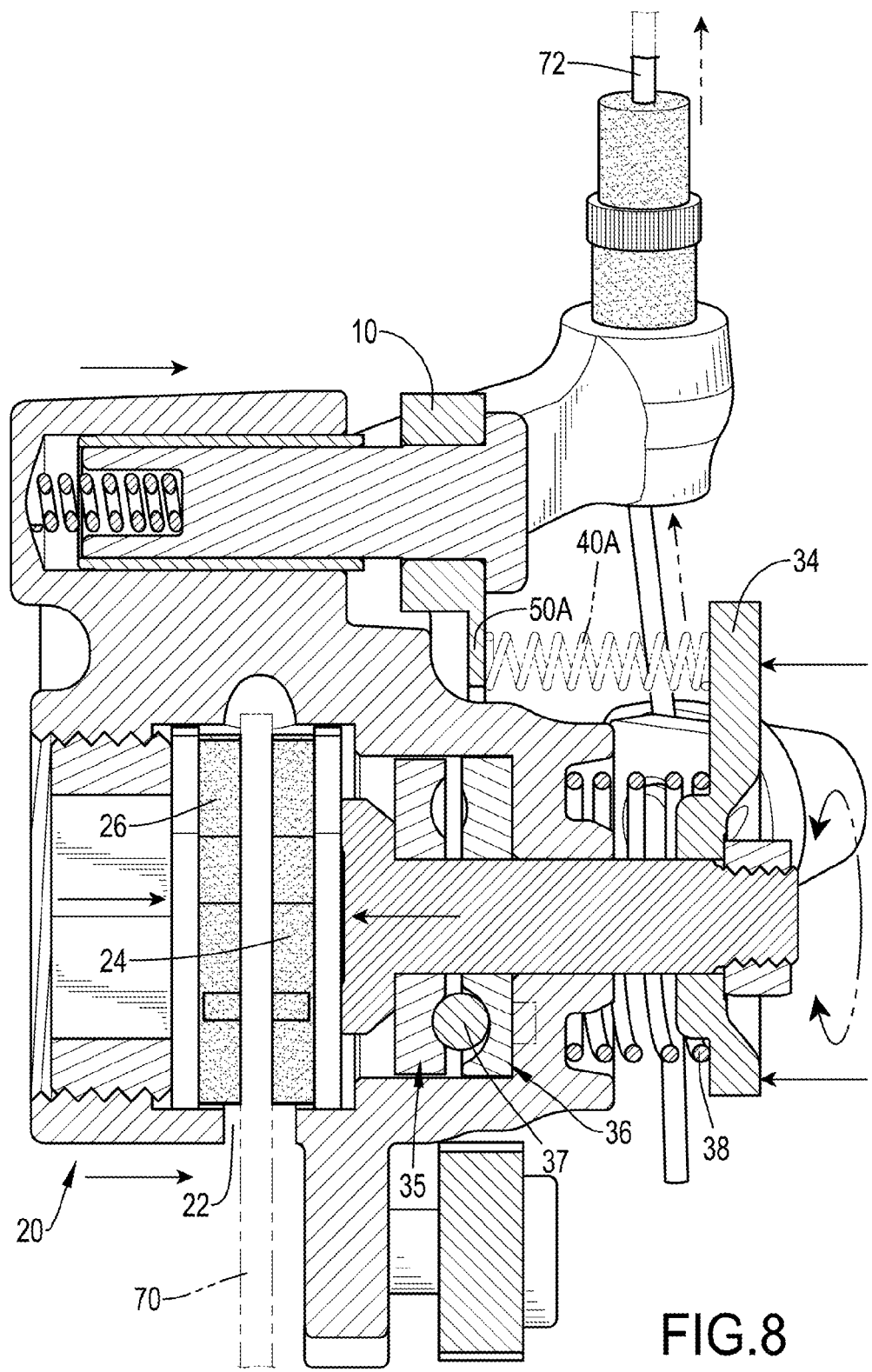
FIG. 8 is an operational side view in partial section of the disk brake device in FIG. 7.

With reference to FIGS. 7 and 8, in the second embodiment, the pushing element 40A is resilient, such as a spring or a resilient block, and has a first end and a second end. The first end of the pushing element 40A is securely connected with the driving arm 34. The second end of the pushing element 40A abuts against the fixing member 10. The fixing member 10 has a curved pressed member 50A abutted against by the second end of the pushing element 40A and being flush with the fixing member 10. With such an arrangement, when the housing 20 is driven to move toward the fixing member 10 by the driving elements 37 and the pushing disk 36, the pushing element 40A is compressed to generate a counterforce applied to the housing 20. With the counterforce, the housing 20 is actuated to move toward the fixing member 10 to enable the two brake pads 24,26 to abut respectively against two sides of the brake disk 70 to provide an even braking effect.

Figure 9:
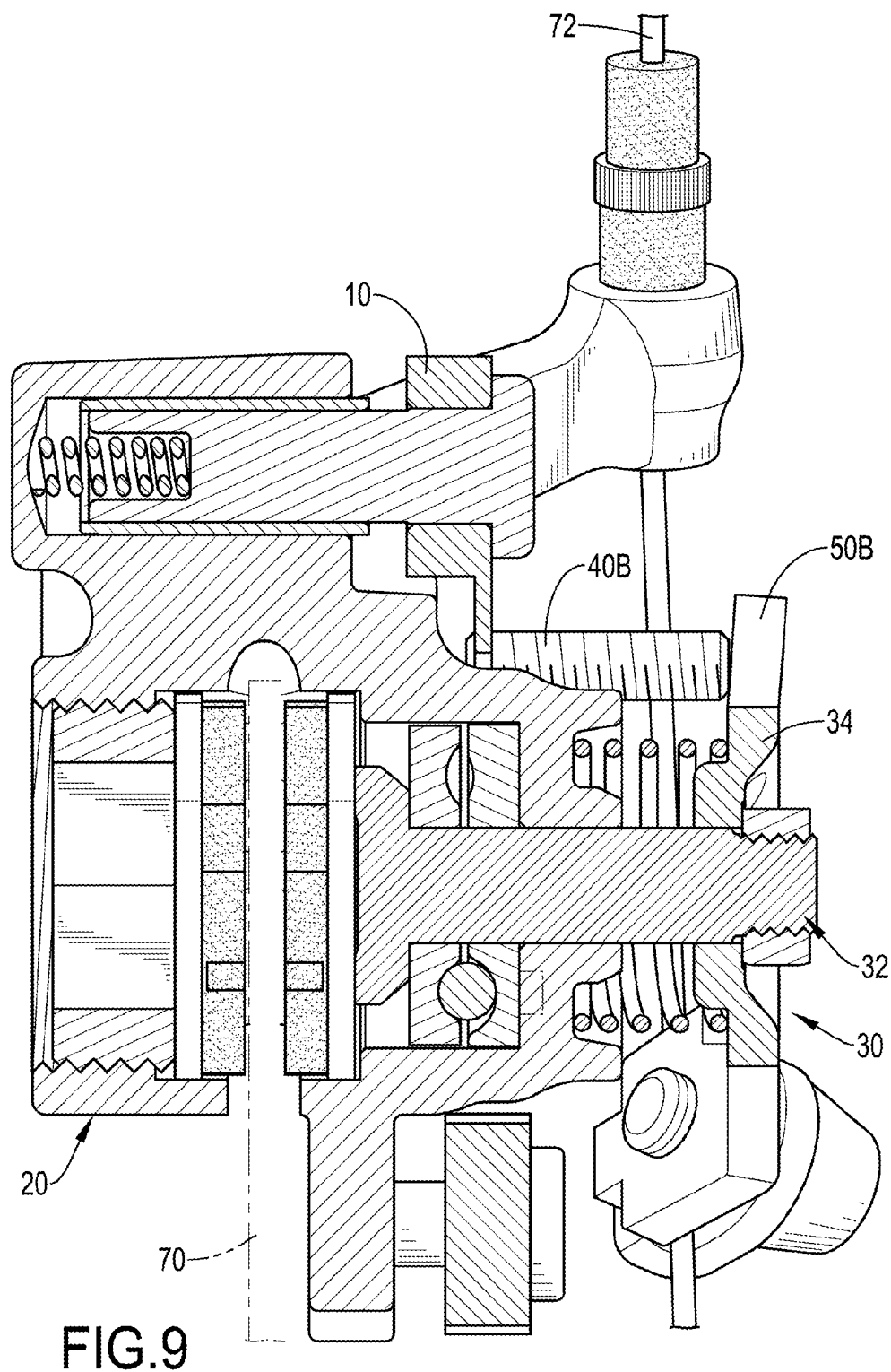
FIG. 9 is a side view in partial section of a third embodiment of a disk brake device in accordance with the present invention.

With reference to FIG. 9, in the third embodiment, the pushing element 40B is a rigid rod and has a first end and a second end. The first end is securely connected with the fixing member 10. The second end abuts against the driving arm 34. The driving arm 34 has a curved pressed member 50B abutted against by the second end of the pushing element 40B and being inclined relative to the driving arm 34.

Figure 10:
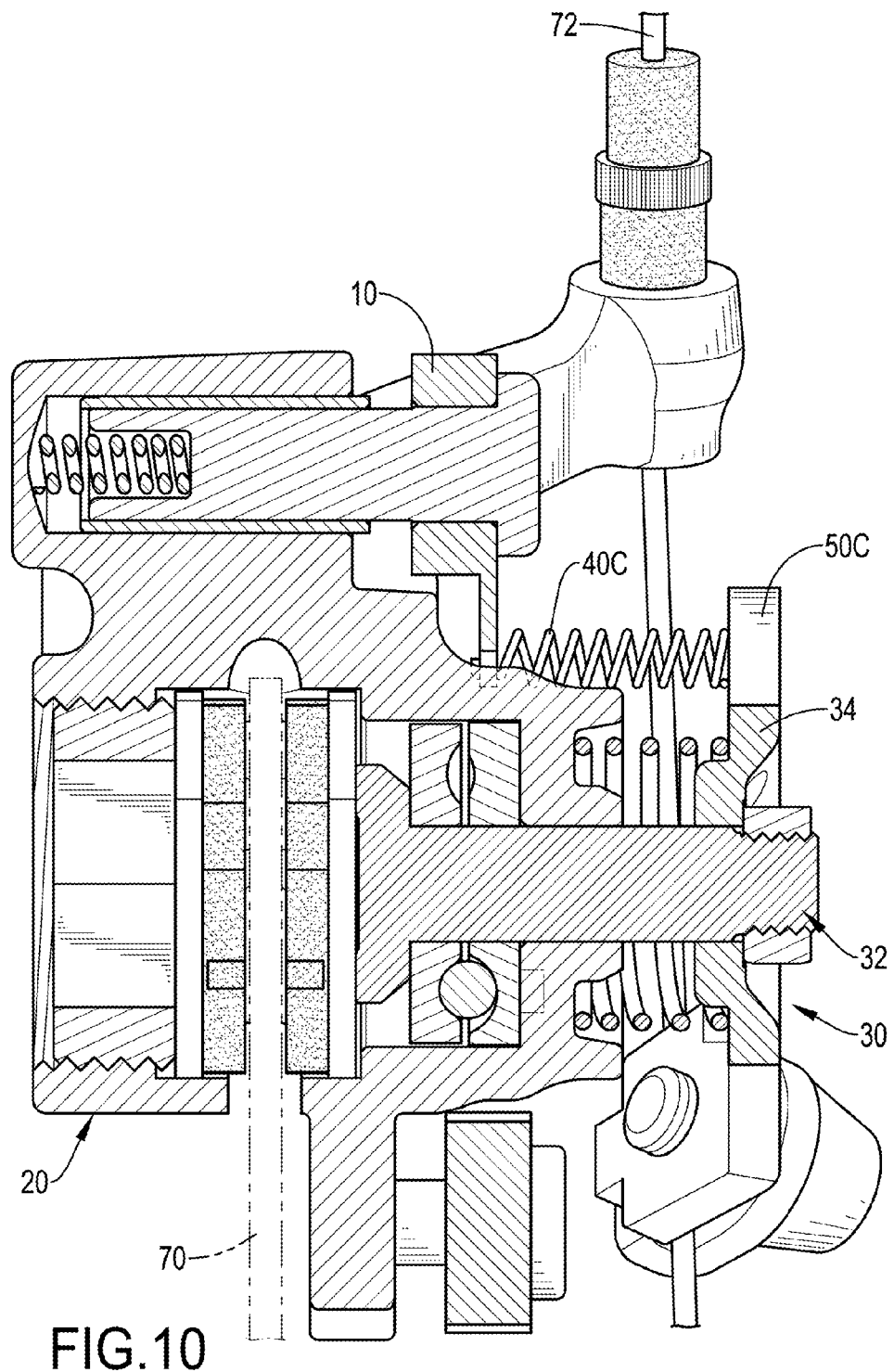
FIG. 10 is a side view in partial section of a fourth embodiment of a disk brake device in accordance with the present invention.

With reference to FIG. 10, in the fourth embodiment, the pushing element 40C is resilient and has a first end and a second end. The first end is securely connected with the fixing member 10. The second end abuts against the driving arm 34. The driving arm 34 has a curved pressed member 50C abutted against by the second end of the pushing element 40C and being flush with the driving arm 34.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A disk brake device comprising:
   a fixing member adapted to be securely mounted on a bicycle frame;
   a housing moveably connected with the fixing member and having an outer surface and a clamping slit defined in the outer surface of the housing;
   two brake pads mounted in the housing and respectively located at two sides of the clamping slit;
   a driving assembly mounted on the housing and comprising
      an axle mounted rotatably in the housing and having a first end extending out of the housing;
      a driving arm mounted securely on the first end of the axle;
      a driving disk held in the housing and mounted securely on and around the axle;
      a pushing disk held in the housing at a position between the driving disk and an inner surface of the housing and mounted rotatably on and around the axle, wherein
         each of the driving disk and the pushing disk has a side facing each other and multiple guiding recesses defined in the side;
         the guiding recesses in the driving disk correspond in position respectively to the guiding recesses in the pushing disk; and
         each guiding recess in each of the driving disk and the pushing disk has two ends, and one of the two ends of each guiding recess has a depth deeper than a depth of the other end to define a deep end and a shallow end in the guiding recess;
      multiple driving elements mounted between the driving disk and the pushing disk and held respectively in corresponding guiding recesses in the driving disk and the pushing disk; and a spring mounted around the axle at a position between the housing and the driving arm and having two ends respectively abutting the housing and the driving arm; and a pushing element mounted between the driving assembly and the fixing member and abutting against one of the driving assembly and the fixing member, wherein the pushing element is a rigid rod and has
a first end securely connected with the driving arm; and
a second end abutting against the fixing member;

the fixing member has a curved pressed member abutted against by the second end of the pushing element and being inclined relative to the fixing member.

2. The disk brake device as claimed in claim 1, wherein the axle has a second end opposite the first end and a pressing segment formed on the second end and abutting one of the brake pads; and the driving disk abuts the pressing segment on the axle.

3. A disk brake device comprising:
a fixing member adapted to be securely mounted on a bicycle frame;
a housing moveably connected with the fixing member and having an outer surface and a clamping slit defined in the outer surface of the housing;
two brake pads mounted in the housing and respectively located at two sides of the clamping slit;
a driving assembly mounted on the housing and comprising
an axle mounted rotatably in the housing and having a first end extending out of the housing;
a driving arm mounted securely on the first end of the axle;
a driving disk held in the housing and mounted securely on and around the axle;
a pushing disk held in the housing at a position between the driving disk and an inner surface of the housing and mounted rotatably on and around the axle, wherein
each of the driving disk and the pushing disk has a side facing each other and multiple guiding recesses defined in the side;
the guiding recesses in the driving disk correspond in position respectively to the guiding recesses in the pushing disk; and
each guiding recess in each of the driving disk and the pushing disk has two ends, and one of the two ends of each guiding recess has a depth deeper than a depth of the other end to define a deep end and a shallow end in the guiding recess;
multiple driving elements mounted between the driving disk and the pushing disk and held respectively in corresponding guiding recesses in the driving disk and the pushing disk; and
a spring mounted around the axle at a position between the housing and the driving arm and having two ends respectively abutting the housing and the driving arm; and
a pushing element mounted between the driving assembly and the fixing member and abutting against one of the driving assembly and the fixing member, wherein
the pushing element is resilient and has
a first end securely connected with the driving arm; and
a second end abutting against the fixing member;

the fixing member has a curved pressed member abutted against by the second end of the pushing element and being flush with the fixing member.

4. The disk brake device as claimed in claim 3, wherein the axle has a second end opposite the first end and a pressing segment formed on the second end and abutting one of the brake pads; and the driving disk abuts the pressing segment on the axle.

5. A disk brake device comprising:
a fixing member adapted to be securely mounted on a bicycle frame;
a housing moveably connected with the fixing member and having an outer surface and a clamping slit defined in the outer surface of the housing;
two brake pads mounted in the housing and respectively located at two sides of the clamping slit;
a driving assembly mounted on the housing and comprising
an axle mounted rotatably in the housing and having a first end extending out of the housing;
a driving arm mounted securely on the first end of the axle;
a driving disk held in the housing and mounted securely on and around the axle;
a pushing disk held in the housing at a position between the driving disk and an inner surface of the housing and mounted rotatably on and around the axle, wherein
each of the driving disk and the pushing disk has a side facing each other and multiple guiding recesses defined in the side;
the guiding recesses in the driving disk correspond in position respectively to the guiding recesses in the pushing disk; and
each guiding recess in each of the driving disk and the pushing disk has two ends, and one of the two ends of each guiding recess has a depth deeper than a depth of the other end to define a deep end and a shallow end in the guiding recess;
multiple driving elements mounted between the driving disk and the pushing disk and held respectively in corresponding guiding recesses in the driving disk and the pushing disk; and
a spring mounted around the axle at a position between the housing and the driving arm and having two ends respectively abutting the housing and the driving arm; and
a pushing element mounted between the driving assembly and the fixing member and abutting against one of the driving assembly and the fixing member, wherein
the pushing element is a rigid rod and has
a first end securely connected with the fixing member; and
a second end abutting against the driving arm;
the driving arm has a curved pressed member abutted against by the second end of the pushing element and being inclined relative to the driving arm.

6. The disk brake device as claimed in claim 5, wherein the axle has a second end opposite the first end and a pressing segment formed on the second end and abutting one of the brake pads; and the driving disk abuts the pressing segment on the axle.

7. A disk brake device comprising:
a fixing member adapted to be securely mounted on a bicycle frame;

a housing moveably connected with the fixing member and having an outer surface and a clamping slit defined in the outer surface of the housing;

two brake pads mounted in the housing and respectively located at two sides of the clamping slit;

a driving assembly mounted on the housing and comprising an axle mounted rotatably in the housing and having a first end extending out of the housing;

a driving arm mounted securely on the first end of the axle;

a driving disk held in the housing and mounted securely on and around the axle;

a pushing disk held in the housing at a position between the driving disk and an inner surface of the housing and mounted rotatably on and around the axle, wherein each of the driving disk and the pushing disk has a side facing each other and multiple guiding recesses defined in the side;

the guiding recesses in the driving disk correspond in position respectively to the guiding recesses in the pushing disk; and each guiding recess in each of the driving disk and the pushing disk has two ends, and one of the two ends of each guiding recess has a depth deeper than a depth of the other end to define a deep end and a shallow end in the guiding recess;

multiple driving elements mounted between the driving disk and the pushing disk and held respectively in corresponding guiding recesses in the driving disk and the pushing disk; and a spring mounted around the axle at a position between the housing and the driving arm and having two ends respectively abutting the housing and the driving arm; and a pushing element mounted between the driving assembly and the fixing member and abutting against one of the driving assembly and the fixing member, wherein the pushing element is resilient and has a first end securely connected with the fixing member; and a second end abutting against the driving arm;

the driving arm has a curved pressed member abutted against by the second end of the pushing element and being flush with the driving arm.

8. The disk brake device as claimed in claim 7, wherein the axle has a second end opposite the first end and a pressing segment formed on the second end and abutting one of the brake pads; and the driving disk abuts the pressing segment on the axle.

* * * * *